June 27, 1939.  W. A. PETERS, JR  2,164,080
FRACTIONATING PLATE
Filed July 21, 1937  2 Sheets-Sheet 1
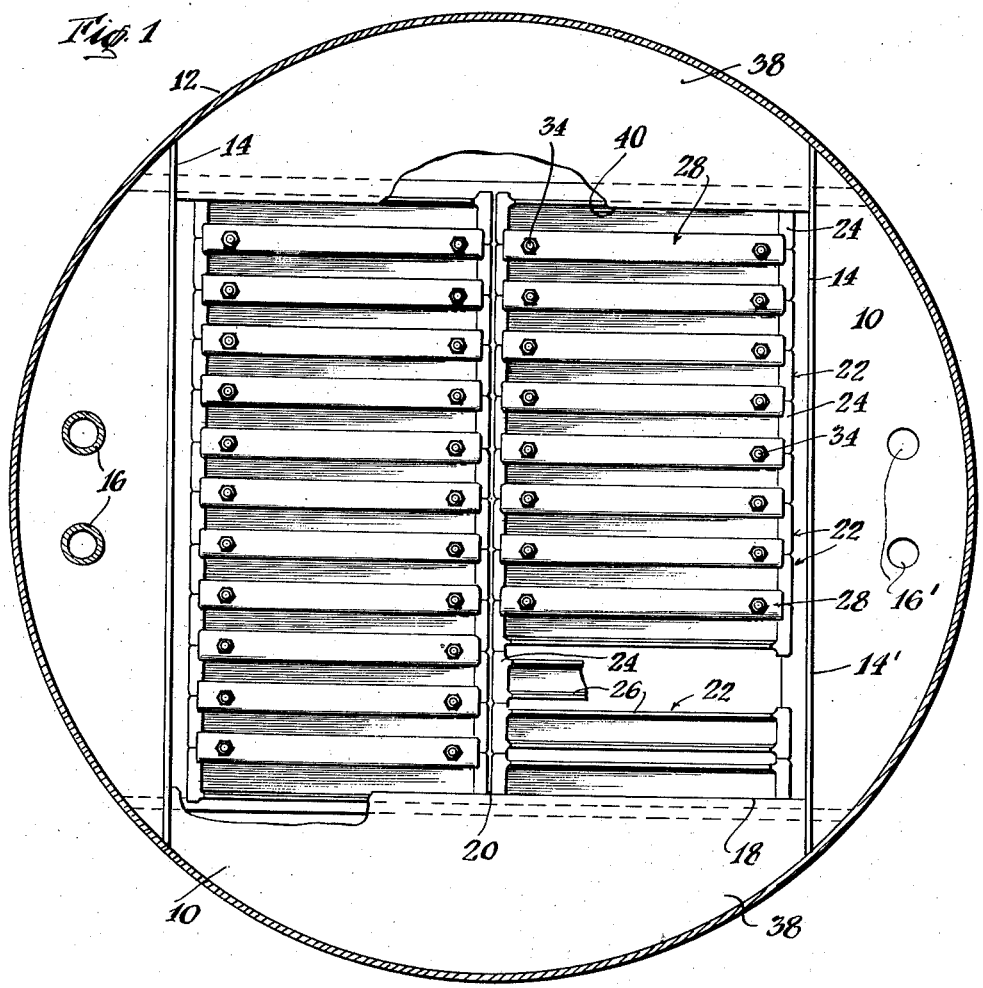
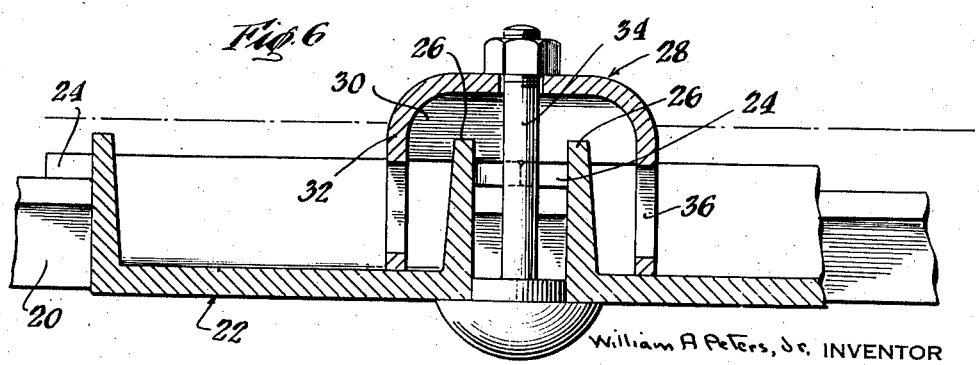
William A Peters, Jr. INVENTOR
BY
ATTORNEYS

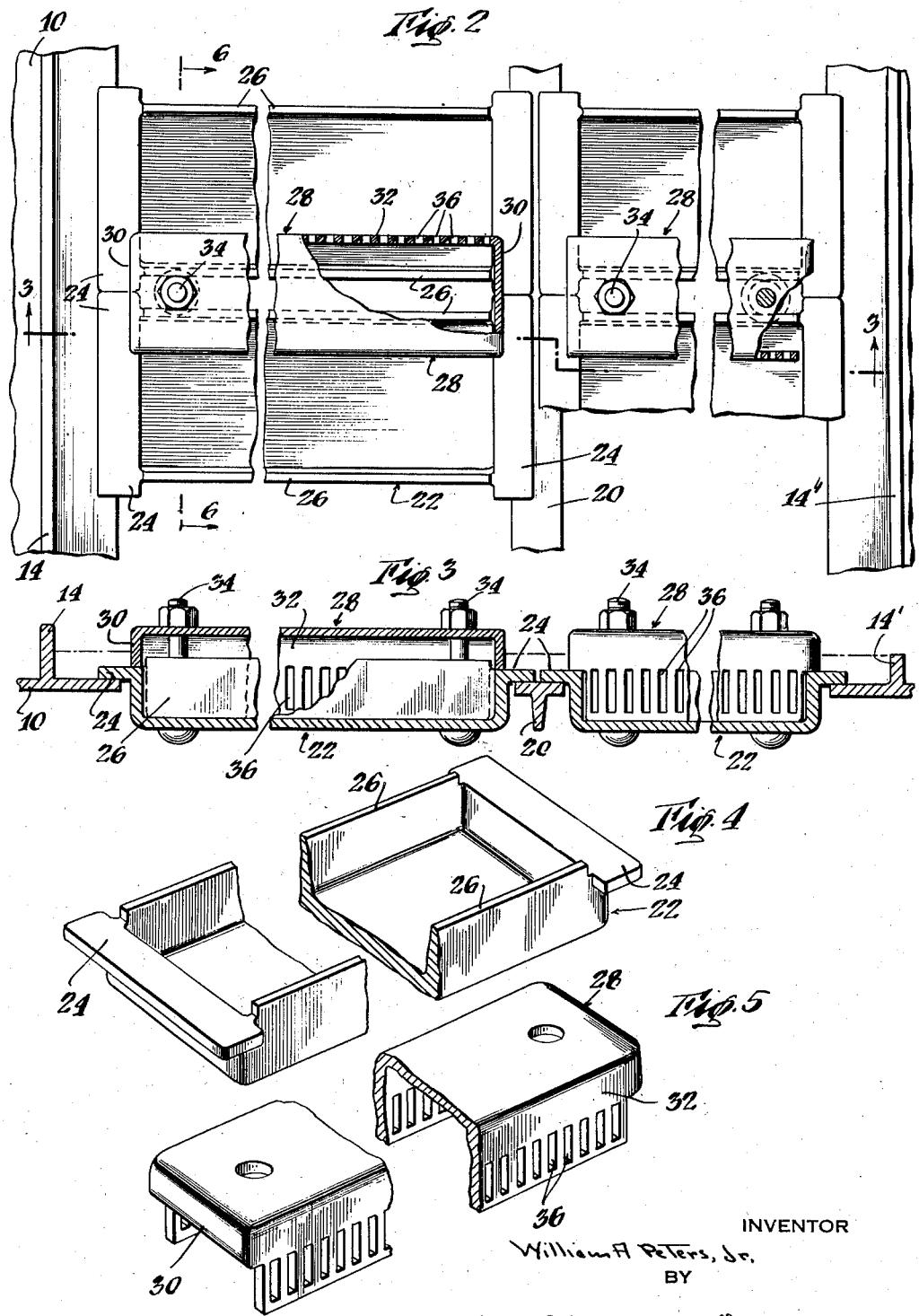

Patented June 27, 1939

2,164,080

UNITED STATES PATENT OFFICE 2,164,080

FRACTIONATING PLATE

William A. Peters, Jr., Seattle, Wash., assignor to E. B. Badger & Sons Co., Boston, Mass., a corporation of Massachusetts Application July 21, 1937, Serial No. 154,780

4 Claims. (Cl. 261—114)

This invention relates to fractionating plates for use in fractionating columns or stills. In these columns or stills the vapors pass upwardly from the bottom of the still through reflux liquid flowing downwardly from the top of the still and across the fractionating plates.

Fractionating plates, such as are commonly in use, are fitted with chimneys and bubble caps. The vapors passing upwardly through the tower are deflected by the bubble caps at each plate and caused to bubble through the liquid on the plate. Usually the plates are flat and of an area substantially as great as the cross-sectional area of the column. These plates therefore present elongated outer edges which must be machined to fit them accurately in the column and to produce substantially liquid tight joints for preventing leakage of the liquid from one plate to another. The machining operations required in the production of the plates are expensive, thereby greatly increasing the cost of the fractionating towers.

The principal object of this invention is to produce fractionating plates consisting of a plurality of small units which may be easily assembled to form a plate satisfactory from the standpoint of preventing leakage of liquid without machining and efficient as to the contacting of the vapor and reflux liquid.

A further object of the invention is to produce fractionating plates in which the vapor passages are disposed below the normal level of the liquid on the fractionating plates but above the upper surface of the plate.

In the form of the invention illustrated, a fractionating plate assembly may consist of a pan to which liquid is delivered having supporting elements thereacross upon which are seated a plurality of plate members provided with upstanding rims which project above the surface of the pan but below the normal level of the liquid on the pan. Bubble caps with downwardly depending side flanges straddle the adjacent rims of adjacent plate members to direct the vapors through the liquid on the plate. The bubble caps are provided with bubble slots or apertures which are disposed below the tops of the rims of the plate members, thereby causing the vapors to bubble through the liquid on the plate and to build up a slight pressure to reduce the level of the liquid within the bubble caps. Comparatively narrow supporting flanges are provided on the plate members which abut or overlie similar flanges on adjacent plate members. The flanges are so proportioned and may be so supported that they form a substantially liquid tight joint without being machined.

This construction has the advantage that a plurality of the plate members and bubble caps may be readily assembled to produce fractionating plates of any desired size which will efficiently handle the reflux liquid without leakage.

For a better understanding of the present invention, reference may be had to the accompanying drawings in which:

Figure 1 is a plan view partly broken of a fractionating plate embodying one form of the invention;

Figure 2 is an enlarged plan view partly broken;

Figure 3 is an enlarged cross-sectional view taken on line 3—3 of Figure 2;

Figure 4 is a broken perspective view of one of the plate members;

Figure 5 is a broken perspective view of one of the bubble caps; and

Figure 6 is a sectional view taken on line 6—6 of Figure 2.

In the form of the invention illustrated, the fractionating plate consists of a circular pan 10 of any desired size having an upstanding rim 12 and a dam 14 thereacross over which reflux liquid flows from the down flow pipes 16. The ends of the pipes 16 are disposed below the tops of the dam 14 thereby creating a liquid seal and preventing passage of vapor up the pipes. A similar dam 14' of the same or lesser height is provided on the opposite side of the pan over which the reflux liquid flows to down spouts 16' for delivery to the next lower fractionating plate. The height of dam 14' controls the level of the liquid on the plates. The pan 10 is provided with a substantially square center aperture 18 which is divided by a T-beam 20 supporting the plate members 22. It will be understood that the shape and size of the pan 10 can be varied, as desired, as well as the shape and size of the aperture 18. Likewise, the T-beam may be eliminated in smaller plates or a plurality of them may be used in larger plates.

Each plate member 22 consists of a trough-shaped casting having narrow flat flanges 24 extending from opposite ends of the members and laterally beyond their side walls 26. As illustrated the plate members 22 may be rectangular but, if desired may be of any shape suitable to fit in the pan 10. The side walls 26 project above the upper surface of the flanges 24 for a purpose to be described.

The plate members 22 are placed in the aperture 18 of the pan 10 with flanges 24 resting on the T-beam 20 and on the pan adjacent the aperture 18 as shown in Figures 1 to 3, or with the flanges on one row of plate members resting on the adjacent flanges of another row of plate members to produce a stepped arrangement of the plate members to facilitate flow of liquid across the pan 10.

Since the narrow flanges 24 project beyond the side walls 26 of the plate members, the longitudinal side walls 26 of adjacent plate members are spaced apart leaving an opening for upward vapor flow. The flanges 24 as cast, and without machining because of their form and manner of support, act with the adjacent flanges to give substantially liquid tight joints.

The vapor passages between the side walls 26 of adjacent plate members 22 are covered by bubble caps consisting of inverted trough-like rectangular members 28 having narrow end walls 30 and side walls 32, the lower edges of which rest on the bottoms of the plate members 22. The side walls 32 are of sufficient height so that the inner portion of the bubble cap remains spaced above the walls 26 of the plate members. The narrow end walls 30 seat tightly against the upper surfaces of the flanges 24 to prevent leakage of liquid at these points. The bubble caps 28 and plate members 22 may be connected and retained in tight engagement by any suitable means, such as bolts 34 having enlarged heads engaging the bases of adjacent plate members and passing through the bubble caps.

The side walls 32 of the bubble caps are slotted to provide passages 36 through which the vapors pass, the slots terminating below the level of the side walls 26. This arrangement of the bubble caps maintains the level of the liquid enclosed therein at a lesser height than the level of the reflux liquid on the plate. The pressure of the vapor is sufficient to displace the liquid to a level below the tops of walls 26. At the same time the gases are forced to bubble through and are washed by the liquid externally of the caps since the upper edges of the bubble slots are below the tops of walls 26 and the level of the reflux liquid on the plate.

The above described construction presents the advantage that the film of liquid flowing across the fractionating plate cannot leak over the side walls 26 of the plate members 22 within the bubble caps 28.

The joints formed by the flanges 24 and their supporting elements are sufficient to retain the liquid on the plates for the pressure of the vapor below the plate overcomes any tendency of liquid to seep through the joints. It should be noted that the joints are sufficiently elevated so that the liquid head which the vapors must overcome is minimized. Thus any leakage through the joints will be the upward flow of vapor and not the downward flow of liquid.

The outermost plate members 22 are maintained in sealing relation to the pan 10 by means of plates 38 having their upper surfaces disposed on the level of dam 14 or above the normal liquid level on the plate and having a downwardly directed flange 40 extending from dam 14 to dam 14' cooperating the plate members 22 and the supporting members to form a liquid seal.

It will be understood that the principles of this invention can be embodied in many different shapes and sizes of the device and that the plate members and bubble caps may be supported in the pan in any desired manner without departing from the invention. The device described should therefore be considered illustrative only, and not as limiting the scope of the claims.

I claim:

1. In a fractionating plate the combination of a supporting pan, a plurality of plate members having side walls and end walls, narrow end flanges on said plate members adjacent the upper edges of the end walls and engaging the supporting pan and similar flanges on adjacent plate members, the side walls on adjacent plate members being spaced apart to form vapor passages, bubble caps straddling the passages and extending downwardly between the side walls of adjacent plate members and bubble slots having upper edges disposed below the upper edges of the side walls whereby the joints formed by the flanges and supporting pan are adjacent the surface of liquid on the pan and the bubble slots are disposed substantially entirely below the joints.

2. In a fractionating plate, the combination of a plate member comprising a base, end walls on the base, side walls on the base of greater height than the end walls and supporting flanges projecting outwardly from adjacent the upper edges of the end walls and extending laterally beyond the side walls whereby the plate members may be suspended by the flanges substantially entirely below a supporting structure and the joints formed by the flanges and the supporting structure will be above the major portion of the plate member.

3. In a fractionating plate, the combination of a supporting member having liquid level regulating means thereon, a plurality of separate trough-shaped plate members, flanges on the plate members adjacent their upper edges engaging the supporting member in proximity to the surface of the liquid to suspend the plate members substantially entirely below the supporting member and in spaced relation to provide vapor passages, and bubble caps straddling the vapor passages and having apertures therein disposed within the plate members whereby the joints formed by engagement of the flanges with the supporting member will be subjected to sufficient vapor pressure from below to overcome the hydrostatic pressure of liquid and the leakage of liquid through the joints will be prevented.

4. In a fractionating plate, the combination of supporting means, trough-shaped plate members supported on and depending below said supporting means whereby crevices or joints between the members and the supporting means are substantially in the plane of the supporting means and adjacent the surface of liquid on the fractionating plate, and bubble caps cooperating with the plate members and having bubble apertures disposed within the plate members and substantially entirely beneath the crevices or joints.

WILLIAM A. PETERS, Jr.